United States Patent [19]

Dooley

[11] Patent Number: 5,000,309

[45] Date of Patent: Mar. 19, 1991

[54] CONVEYOR

[76] Inventor: Richard A. Dooley, 400 S. Westwood Ave., Toledo, Ohio 43609

[21] Appl. No.: 480,630

[22] Filed: Feb. 15, 1990

[51] Int. Cl.⁵ .............................................. B65G 17/32
[52] U.S. Cl. .................................. 198/680; 198/485.1; 105/149
[58] Field of Search .................. 198/377, 465.4, 475.1, 198/474.1, 485.1, 486.1, 680; 105/149, 149.1, 149.2

[56] References Cited

U.S. PATENT DOCUMENTS 2,783,962 3/1957 Lyon ................................. 198/486.1
2,821,289 1/1958 Castagnoli et al. .................. 198/680

FOREIGN PATENT DOCUMENTS 947010 8/1982 U.S.S.R. ............................... 198/680

Primary Examiner—Joseph E. Valenza
Attorney, Agent, or Firm—Allen D. Gutchess, Jr.

[57] ABSTRACT

A conveyor has hangers with article-carrying racks which automatically turn transversely to the direction of movement when the hangers are below angled portions of the conveyor. The conveyor is of the overhead monorail type which moves hangers along a predetermined path having a generally horizontal portion and an angled portion. The hangers carry receptacles which receive upper portions of rack hooks which carry the racks. The receptacles and upper portions of the hooks are angled in a manner to cause upright portions of the hooks to turn on their axes when the hangers move between positions below the horizontal portion of the rail and positions below the angled portion of the rail. When the upright portions of the hooks are turned, the racks are also turned to the transverse positions.

20 Claims, 2 Drawing Sheets

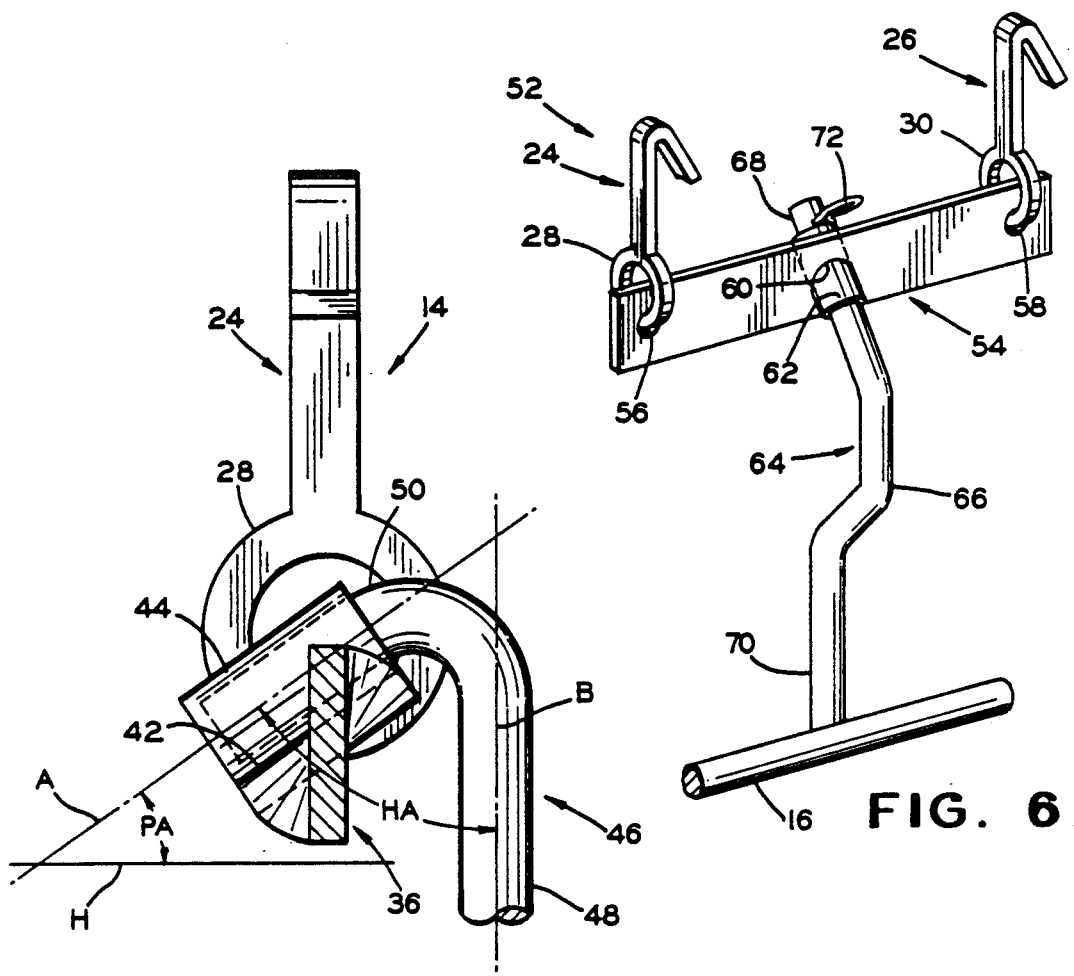
FIG. 4
FIG. 6
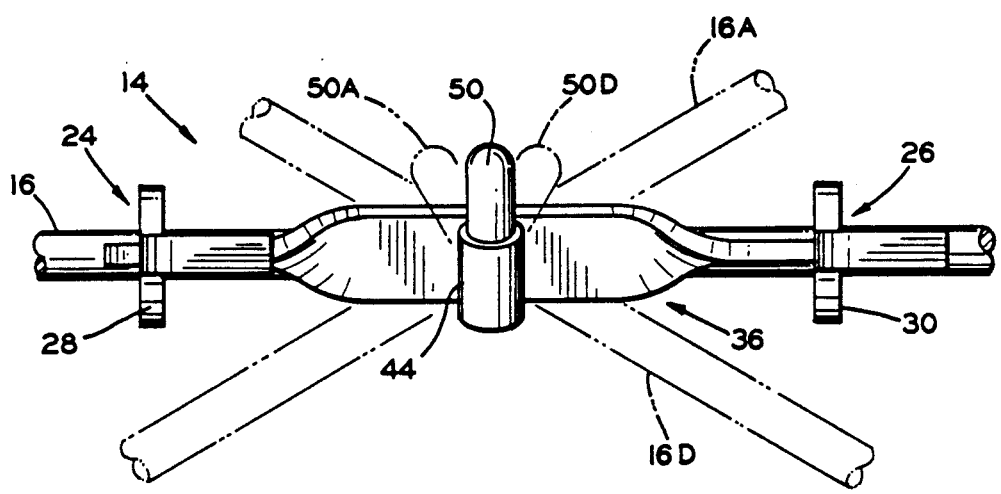
FIG. 5

CONVEYOR

This invention relates to a conveyor with part-carrying racks which are automatically moved to transverse positions when the racks move from positions below horizontal portions of the conveyor to positions below angled portions of the conveyor.

More specifically, the conveyor is of the monorail type which moves racks or frames of parts or articles supported below the rail along predetermined path. The path typically extends through cleaning and/or painting and baking operations for the parts. Since the parts are usually cleaned or coated from both sides, the part racks must be positioned parallel to the path along which they move so that opposite surfaces of the parts can be equally treated from both sides.

In most instances, the monorail conveyors must move the parts along angular portions of the path as well as horizontal ones when the parts are moved between floors or different levels of operation. When the parts move along the angled portions of the path, the racks must not touch one another, which, of necessity, requires that the racks be spaced apart a substantial distance when on the horizontal portions of the predetermined path. Heretofore, to avoid contact of adjacent racks during forty-five degree ascending and descending portions of the path, for example, the racks typically were spaced apart on the horizontal portions of the path a distance equal to one and one-half times the rack width.

The unique conveyor design in accordance with the invention causes the part racks or frames to automatically rotate about upright axes between positions in which they are parallel to the predetermined path when the racks are below horizontal portions of a rail of the conveyor to positions in which they are transverse to the path when the racks are below angled, ascending or descending, portions of the conveyor rail. The design of the conveyor can cause the racks to rotate up to about ninety degrees when moving from the horizontal to the angled portions of the predetermined path. With that degree of movement, only the thickness of the racks need be taken into account when they are at the angled portions of the predetermined path. Consequently, the racks can be almost in contact when positioned parallel to the predetermined path and below the horizontal portion of the conveyor rail. Therefore, a substantially continuous wall of parts can be presented as they pass through cleaning, painting and baking operations, for example. The throughput capacity of an existing operation including a monorail conveyor having typically forty-five degree ascending and descending portions can be increased substantially fifty percent, maintaining the same processing cycle times and changing only the feed rates of coating materials applied to parts. The new conveyor design also enables preloaded racks or frames of parts to be relatively easily hung on and removed from conveyor hangers. The conveyor design also enables the racks or frames to be more accurately positioned parallel to the direction of the predetermined path along which they move, which is important when precise spacing between the parts and spray gun nozzles, for example, is required for uniform coating or finishing.

A conveyor in accordance with the invention includes an overhead rail having at least one generally horizontal portion and one angled portion which carries the parts along ascending or descending portions of a predetermined path. The overhead rail typically has roller chains below which hangers extend. A link or bar is pivotally connected to two hangers and carries an elongate receptacle or socket having an axis lying in a plane which is perpendicular to both the conveyor rail and the path along which the articles are moved. The axis of the receptacle also is positioned to form a predetermined pivot angle relative to an intersecting horizontal line which lies in that plane when the receptacle is below a horizontal portion of the conveyor rail.

In accordance with the invention, the conveyor also has a rack hook which suspends an article rack or frame below the conveyor rail. The rack hook has an elongate upright portion to which the rack is affixed at a lower end portion. The hook also has an elongate upper end portion which is straight and forms an acute angle with the axis of the upright portion and with a vertical intersecting line, the hook angle being complementary to the angle which the receptacle axis forms with its horizontal line, the two angles substantially equalling ninety degrees. The upright and upper portions of the hook also lie in a plane which is substantially vertical when the hook is below the horizontal portion of the rail as well as below the angled portion.

When the hangers are moved to a position below the angled portion of the rail, the axis of the elongate receptacle continues to lie in a plane which is perpendicular to both the conveyor rail and the predetermined path of the parts and continues to form the same pivot angle with an intersecting horizontal line which lies in that plane. The axis of the upper straight portion of the hook remains in alignment or coaxial with the axis of the receptacle or socket. However, the upright portion of the hook remains substantially vertical under the force of gravity with the result that the upper straight portion of the hook turns in the receptacle. Consequently, the upright portion of the hook turns relative to the path of predetermined movement of the parts with the result that the rack or frame, which had been parallel to the direction of movement of the parts, now is turned transversely to the direction of movement. With this arrangement, the racks or frames are automatically turned transversely to the path of the racks as they ascend or descend the angled portions of the conveyor rail. This is accomplished without the need for any special cams, gears, or the like to cause such rotation of the racks.

In a preferred form of the invention, the upper straight portions of the rack hooks are angled downwardly so that the racks and hooks can be relatively easily assembled with and disassembled from the receptacles of the conveyor hangers. However, they can also be angled upwardly for greater clearance with the links which carry the receptacles.

The pivot angles of the axes of the receptacles and the hook angles of the upper portions of the hooks can be changed to meet the particular requirements of the particular conveyor, racks or frames, and size and shape of parts being transported.

It is, therefore, a principal object of the invention to provide a conveyor for racks of parts which causes the racks to turn transversely to their path of movement when the racks are carried along ascending or descending paths.

Another object of the invention is to provide a conveyor employing racks for parts which can be moved automatically to transverse positions without requiring special, separate auxiliary components to accomplish this.

Many other obJects and advantages of the invention will be apparent from the following detailed description of preferred embodiments thereof, reference being made to the accompanying drawings, in which:

FIG. 4 is an enlarged view in cross section taken along the line 4—4 of FIG. 3;

FIG. 5 is a plan view of the components of FIG. 3 and showing certain components in dotted line positions; and FIG. 6 is a view in perspective of modified components corresponding to the components of FIG. 3.

Figure 1:
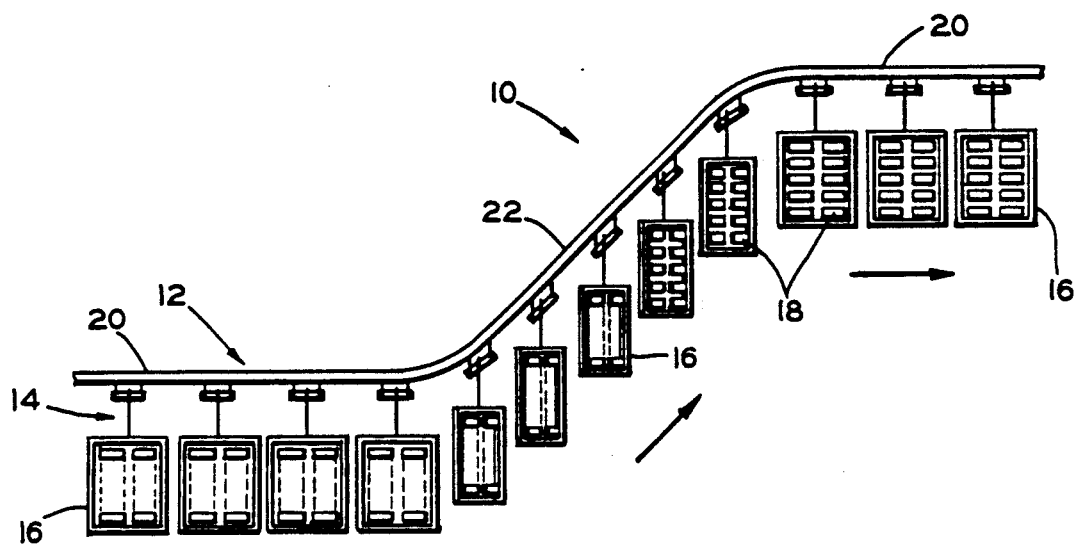
FIG. 1 is a schematic view in elevation of a conveyor in accordance with the invention.
Figure 2:
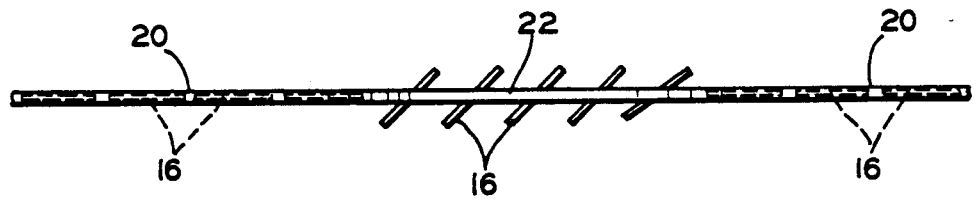
FIG. 2 is a schematic plan view of the conveyor of FIG. 1.

Referring to FIGS. 1 and 2, a conveyor embodying the invention is indicated at 10 and includes an overhead monorail 12 and support assemblies 14 for carrying racks or frames 16 for parts or articles 18. The rail 12 has horizontal portions 20 and angled portions 22, one being shown. Operations on the parts, such as cleaning, coating, and baking, are usually performed along the horizontal portions 20 of the monorail 12 and the parts 18 and racks 16 are moved between different levels or floors along the angled portions 22. The racks 16 must be parallel to their movement along a predetermined path, as determined by the monorail 12, when they are on the horizontal portions 20 thereof. In this manner, the parts 18 can be sprayed, etc. equally from both sides. Heretofore, the racks 16 had to be spaced apart a sufficient distance that the edges did not contact one another when they were on the angled portion of the conveyor. However, when the racks are turned transversely on the angled portion 22, they can be virtually in contact when on the horizontal portions 20. This close spacing has a number of advantages as discussed previously.

Figure 3:
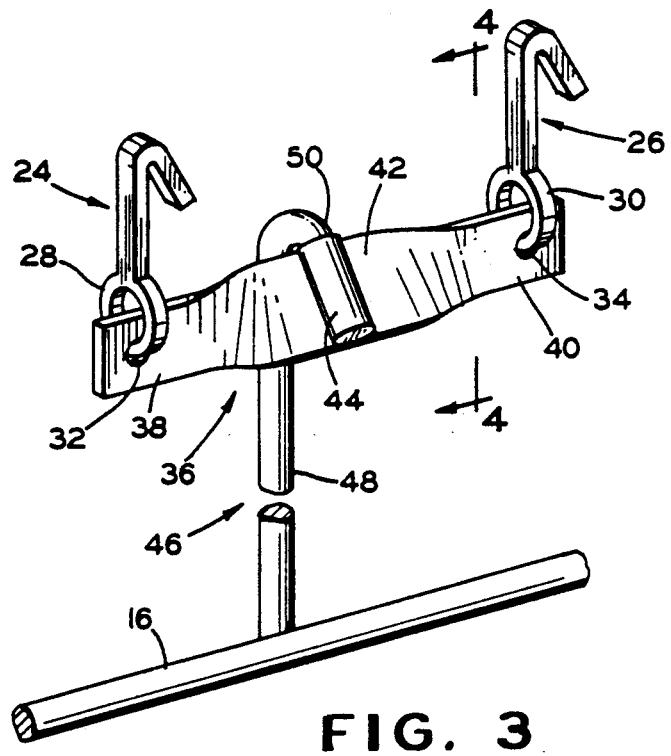
FIG. 3 is a fragmentary view in perspective of certain components of the conveyor in accordance with the invention.

The racks 16 are turned automatically to the transverse positions on the angled portion 22 by the design of the support assemblies 14. One of the support assemblies 14 is shown in FIGS. 3-5. Two hangers 24 and 26 engage a roller chain (not shown) carried by the monorail 12 and move along the monorail with the chain, which is powered by suitable drive means located in a suitable location along the monorail, as is well known in the art. The hangers 24 and 26 have lower rings 28 link 36 to loosely connect the hangers and the link. The openings are located in end portions 38 and 40 of the link 36 with a twisted or angled -intermediate portion 42 therebetween. The loose connection between the hangers and link enables relative movement therebetween to accommodate more extreme transverse positions of the racks. The hangers 24 and 26 always maintain the link 36 parallel to the monorail 12, whether below the horizontal portions 20 or the angled portions 22.

An elongate receptacle or socket 44 is carried by the link 36 at a predetermined angle, the angle in this instance being the same as the angle of the twisted intermediate portion 42 of the link, with the receptacle 44 affixed, as by welding, to the upper or lower surface of the portion 42. The elongate receptacle 44 has an axis lying in a plane which is perpendicular to both the conveyor rail 12 and the predetermined path along which the racks are moved. The axis of the receptacle also is positioned to form a predetermined pivot angle relative to a horizontal plane when the receptacle is below a horizontal portion of the conveyor rail. This pivot angle, designated PA in FIG. 4, is formed between the axis A of the receptacle 44 and a horizontal line designated H. When the receptacle 44 is below the angled portion 22 of the monorail 12, the same pivot axis is maintained with the horizontal line, with the axis continuing to lie in a plane which is perpendicular to both the conveyor rail and the path along which the racks are moved. The pivot angle can be changed according to the extent of the slope of the angled portion 22 and the particular physical size and shape of the racks and parts or articles being transported.

Rack hooks or supports 46 are carried by the links 36 and support the article racks 16 therebelow. The rack hooks 46 include elongate upright portions or rods 48 and functionally-integral upper straight end portions or rods 50. An axis of the straight end portion 50 is coaxial with the axis of the elongate receptacle 44. The axis of the straight end portion 50 also forms an acute hook angle designated HA with the an axis B of the upright portion 48 and with a vertical line, as shown in FIG. 4. The pivot angle PA, which the axis of the receptacle 44 forms with the horizontal line, is complementary to the acute angle HA which the upper end portion of the hook forms with the axis other upright portion. The angles PA and HA are coplanar when the support assembly 14 is below the horizontal portions 20 of the conveyor. However, the coplanar relationship ceases to exist when the support assembly 14 is under the angled portion 22 of the conveyor with the hook 46 and the rack 16 turning to the transverse position, as shown in FIG. 2. When the link 36 is moved under the angled portion 22 of the conveyor, the link assumes the same angle of ascent or descent as the rail. The axes of the receptacle 44 and the end portion 50 of the rack hook remain coaxial. However, under the force of gravity, the upright portion 48 also continues to assume an upright position, as shown in FIG. 1. Consequently, the end portion 50 of the rack hook 46 turns in the receptacle 44 with the axis of the upright portion 48 also turning to turn the rack 16 to a position extending transversely to the direction of movement of the racks along the predetermined path when on the angled portion 22 of the conveyor. This position is illustrated in Fig. 5 by dotted lines 50A and 16A for the hook and rack on an ascending angled portion of the conveyor and by dotted lines 50D and 16D for a descending angled portion (not shown) of the conveyor. The turning movement enables the racks 16 to overlap, in effect, as viewed in FIG. 2, without coming into contact. The racks move into coplanar relationship once again, parallel to the predetermined path along which they move, when another one of the horizontal portions 20 of the conveyor is reached. This places the parts in symmetrical relationship for further operations so that they can now be treated equally from both sides.

If the angle of ascent or descent of the angled portion 22 of the monorail 12 is determined and the desired transverse position of the rack 16 below the angled portion 22 is known, the angles PA and HA for the receptacle and hook can be determined algebraically or geometrically. Similarly, the transverse angles of the rack 16 can be determined when the angle of ascent or descent and the angles PA and HA are known.

A slightly modified support assembly 52 is shown in FIG. 6. This assembly includes the same hangers 24 and 26 loosely supporting a modified link 54 through end holes 56 and 58. In this instance, the link 54 is straight and has a central opening 60 through which an elongate receptacle 62 extends and is suitably affixed at the predetermined pivot angle PA to the link, as by welding.

In this instance, a rack hook 64 is again carried by the link 54 and supports the article rack 16 therebelow. The rack hook 64 includes an elongate upright portion or rod 66 and a functionally-integral upper straight end portion or rod 68. In this instance, the upright portion 66 also has an offset 70 to more directly place the weight of the rack 16 and the parts under the receptacle 62 and the link 54 As before, an axis of the straight end portion 68 is coaxial with the axis of the elongate receptacle 62. The axis of the straight end portion 68 forms an acute hook angle HA with an extension of the axis of the elongate upright portion 66. As before, the angles PA and HA are complementary, forming a ninety degree angle in total.

The rack hook 64, in this instance, is held in the receptacle 62 by a pin 72 near the outer end of the straight end portion 68 A pin is not necessary with the hook 46 because it is held in place by gravity. This enables the hook 46 and the rack 16 to be relatively easily engaged with and disengaged from the link 36, which is not readily possible with the rack hook 64. However, the design of the rack hook 64, extending upwardly through the receptacle 62, enables the support assembly 52 to be used with monorails having greater angles of ascent and descent without the rack hook 64 interfering with the link 54, as is possible with more extreme ascent and descent angles with the support assembly 14 of FIGS. 3-5.

Various modifications of the above-described embodiments of the invention will be apparent to those skilled in the art, and it is to be understood that such modifications can be made without departing from the scope of the invention, if they are within the spirit and the tenor of the accompanying claims.

I claim:

1. A conveyor comprising an overhead conveyor rail having a generally horizontal portion and an angled portion which is angularly disposed to a horizontal plane, first hanger means movably carried below said rail, second hanger means movably carried below said rail, a link connected to said first and second hanger means and maintaining them in a spaced relationship, said first and second hanger means and said link being movable in a linear path below said rail, an elongate receptacle carried by said link between said first and second hanger means and positioned transversely to the direction of movement of said link, said receptacle having an axis forming a receptacle angle with a horizontal line when said hanger means are carried by the horizontal portion of said rail, a rack hook having an elongate upright portion and a functionally-integral, elongate, upper end portion, an axis of said upper end portion forming an acute angle with an axis of the upright portion which is substantially complementary to the angle formed by said receptacle axis with its horizontal line, said upper end portion of said hook being received in said receptacle and held for only rotational movement with respect thereto, whereby said upright portion of said hook rotates about a generally vertical axis when said link and said receptacle are below the angled portion of said conveyor rail.

2. A conveyor according to claim 1 wherein an article-carrying rack is carried by said rack hook and said hook causes said article-carrying rack to move from a position in which said rack is generally parallel to the path of movement of said hanger means to an angular position relative thereto when said rack is below the angled portion of said conveyor rail.

3. A conveyor according to claim 1 wherein said upper end portion of said hook is received in said receptacle through a lower end thereof.

4. A conveyor according to claim 3 wherein said upper end portion extends through the receptacle, and means are carried by an upper end of said upper end portion to retain said upper end portion in said receptacle.

5. A conveyor according to claim 1 wherein said first and second hanger means are connected to said link by lower rings on said hanger means extending through openings in said link.

6. A conveyor according to claim 1 wherein said link has an angled intermediate portion forming the same angle as said receptacle angle, with said receptacle affixed to a surface of said angled portion of said link.

7. A conveyor according to claim 1 wherein said link has a central opening therein and said receptacle extends through said opening and is affixed to said link in a position to form said receptacle angle.

8. A conveyor comprising an overhead conveyor rail having a generally horizontal portion and an angled portion which is angularly disposed to a horizontal plane, an elongate receptacle, hanger means movably carried below said rail and positioning said receptacle transversely to said rail with an axis of said receptacle forming an angle with a horizontal line when said hanger means is below the horizontal portion of said rail, a rack hook having an upper end portion and an elongate upright portion, an axis of said upper end portion forming an acute angle with an axis of said upright portion which is substantially complementary to the angle which the axis of said receptacle forms with its horizontal line, said upper end portion of said hook being received by said receptacle for rotational movement with respect thereto, whereby said upright portion of said hook rotates about its axis when said hanger means and said receptacle are moved between a position below the horizontal portion of said conveyor rail and a position below the angled portion of said conveyor rail.

9. A conveyor according to claim 8 wherein an article-carrying rack is mounted on said upright portion of said hook with said article-carrying rack moved from a position in which said rack is generally parallel to the path of movement of said hook to an angular position relative thereto when said rack is moved from a position below the horizontal portion of said conveyor rail to the position below the angled portion of said conveyor rail.

10. A conveyor according to claim 8 wherein said upper end portion of said hook is received in said receptacle through a lower end thereof.

11. A conveyor according to claim 10 wherein said upper end portion extends through the reCeptacle, and means are carried by an upper end of said upper end portion to retain said upper end portion in said receptacle.

12. A conveyor according to claim 8 wherein said hanger means comprises two hangers, a link loosely connected to said two hangers, said receptacle being carried by said link.

13. A conveyor according to claim 12 wherein said link has an angled intermediate portion forming the same angle as said receptacle angle, with said receptacle affixed to a surface of said angled portion of said link.

14. A conveyor according to claim 12 wherein said link has a central opening therein and said receptacle extends through said opening and is affixed to said link in a position to form said receptacle angle.

15. A conveyor comprising an overhead conveyor rail having a generally horizontal portion and an angled portion which is angularly disposed to a horizontal plane, an elongate receptacle, hanger means movably carried below said rail and positioning said receptacle transversely to said rail with an axis of said receptacle forming an angle greater than zero with a horizontal line when said hanger means is below the horizontal portion of said rail, a rack hook having an upper elongate end portion and an upright portion, an axis of said upper end portion forming an acute angle greater than zero with an intersecting vertical line, said upper end portion of said hook being rotatably received in said receptacle, whereby said upright portion of said hook rotates about its axis when said hanger means and said receptacle are below the angled portion of said conveyor rail.

16. A conveyor according to claim 15 wherein an article-carrying rack is mounted on said upright portion of said rack hook and rotates with said upright portion to cause said rack to change its angular position relative to a predetermined path along which said rack moves below said horizontal and angled portions of said conveyor rail.

17. A conveyor according to claim 15 wherein the angle which the axis of said receptacle forms with the horizontal plane is complementary to the acute angle which the axis of said upper end portion of said rack hook forms with the axis of said upright portion thereof.

18. A conveyor according to claim 15 wherein said upper end portion of said hook is received in said receptacle through a lower end thereof.

19. A conveyor according to claim 18 wherein said upper end portion extends through the receptacle, and means are carried by an upper end of said upper end portion to retain said upper end portion in said receptacle.

20. A conveyor according to claim 15 wherein said hanger means comprises two hangers, a link connects said hangers, and said receptacle is affixed to an intermediate portion of said link.

* * * * *

UNITED STATES PATENT AND TRADEMARK OFFICE
CERTIFICATE OF CORRECTION

PATENT NO. : 5,000,309

DATED : March 19, 1991

INVENTOR(S) : Richard A. Dooley

It is certified that error appears in the above-identified patent and that said Letters Patent is hereby corrected as shown below:

Column 1, line 11, after "along" insert --a--.

Column 1, line 26, change "adJacent" to --adjacent--.

Column 2, line 61, change "obJect" to --object--.

Column 2, line 66, change "obJect" to --object--.

Column 3, line 3, change "obJect" to --object--.

Column 3, line 51, after "28" insert --and 30 which extend through openings 32 and 34 in a bar or--.

Column 3, line 54, after "angled" delete "-".

Column 4, line 28, change "other" to --of the--.

Column 5, line 24, after "68" insert --.--.

UNITED STATES PATENT AND TRADEMARK OFFICE
CERTIFICATE OF CORRECTION

PATENT NO. : 5,000,309
DATED : March 19, 1991
INVENTOR(S) : Richard A. Dooley

It is certified that error appears in the above-indentified patent and that said Letters Patent is hereby corrected as shown below:

Column 6, line 60, claim 11, line 2, change "reCeptacle" to

--receptacle--

Signed and Sealed this

Sixteenth Day of November, 1993

Attest:

BRUCE LEHMAN

*Attesting Officer*     *Commissioner of Patents and Trademarks*